W. H. STAHL.
ANTISLIPPING HORSE BOOT.
APPLICATION FILED OCT. 6, 1910.
984,166.
Patented Feb. 14, 1911.
2 SHEETS—SHEET 1.
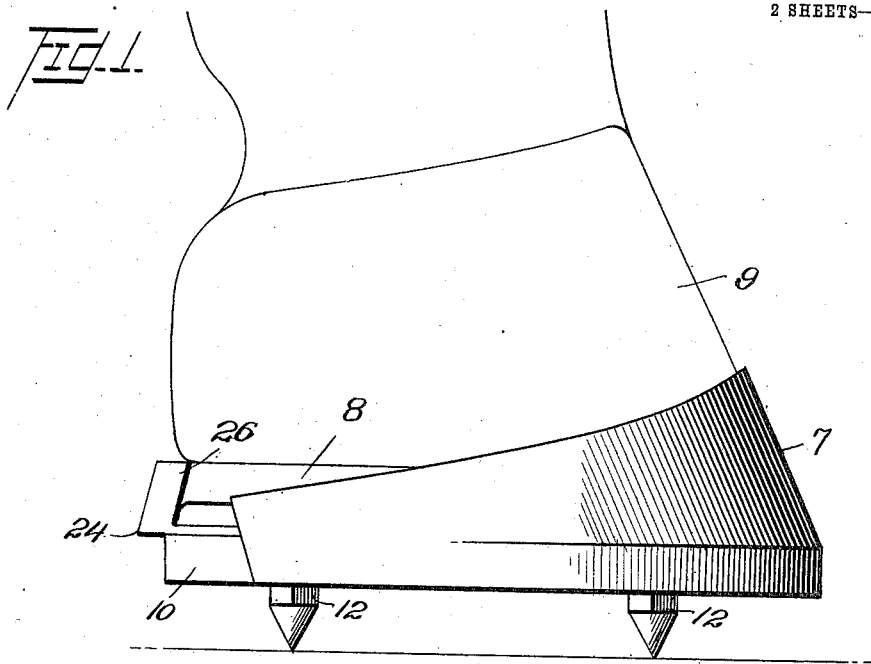
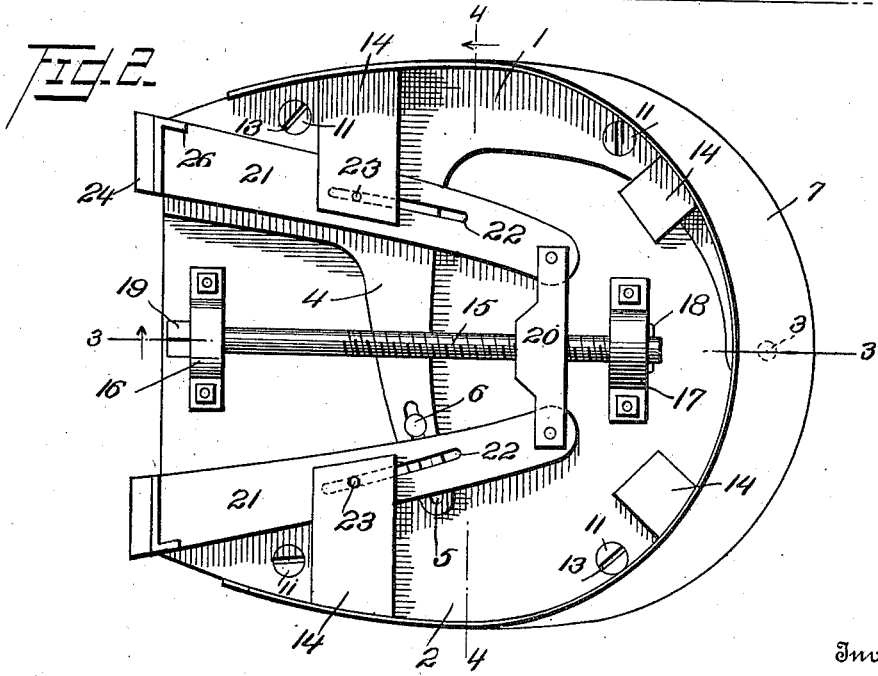
Witnesses
H. Strauss
R. H. Krenkel
Inventor
William H. Stahl,
By Joshua R. H. Potts
Attorney
THE NORRIS PETERS CO., WASHINGTON, D. C.

W. H. STAHL.
ANTISLIPPING HORSE BOOT.
APPLICATION FILED OCT. 6, 1910.
984,166.
Patented Feb. 14, 1911.
2 SHEETS—SHEET 2.
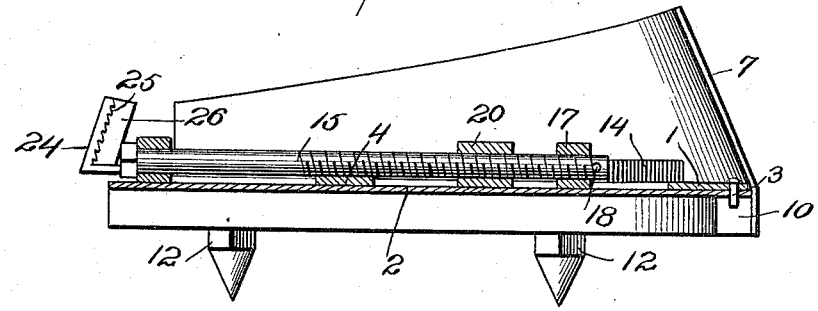
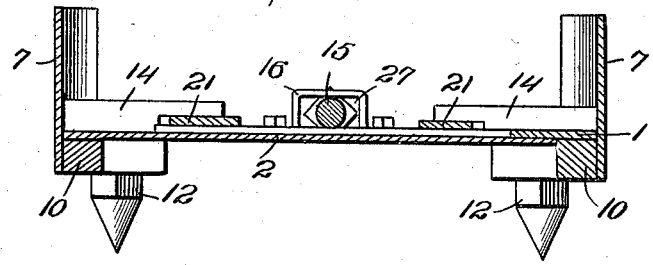
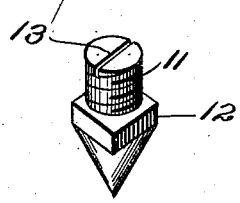 
Witnesses
H. Strauss
R. H. Krenkel
Inventor
William H. Stahl,
By Joshua R. H. Potts,
Attorney

UNITED STATES PATENT OFFICE.

WILLIAM H. STAHL, OF NEW BERLINVILLE, PENNSYLVANIA.

ANTISLIPPING HORSE-BOOT.

984,166.  Specification of Letters Patent.  Patented Feb. 14, 1911.

Application filed October 6, 1910. Serial No. 585,662.

*To all whom it may concern:*

Be it known that I, WILLIAM H. STAHL, a citizen of the United States, residing at New Berlinville, in the county of Berks and State of Pennsylvania, have invented certain new and useful Improvements in Anti-slipping Horse-Boots, of which the following is a specification.

My invention relates to improvements in anti-slipping horse boots, the object of the invention being to provide a boot of this character which can be readily attached to a horse's hoof securely clamping the shoe and preventing any slipping on the ice or snow. A further object is to provide a boot of this character with an improved calk which is so constructed that in the event the shank breaks, it may be readily unscrewed from the hole in the boot without the necessity of drilling the same.

With these and other objects in view, the invention consists in certain novel features of construction and combinations and arrangements of parts, as will be more fully hereinafter described and pointed out in the claims.

In the accompanying drawings: Figure 1, is a view in side elevation illustrating my improvements. Fig. 2, is a top plan view of the boot removed. Fig. 3, is a view in longitudinal section on the line 3—3 of Fig. 2. Fig. 4, is a view in cross section on the line 4—4 of Fig. 2. Fig. 5, is a detail perspective view of one of the calks, and Fig. 6, is an enlarged sectional elevation illustrating the bracket 16.

My improved boot comprises two members 1 and 2, the base portions of which constitute plates pivotally connected at their forward ends by a rivet 3. These plates overlap each other as shown, and plate 1 is provided with a tongue 4 which projects an appreciable distance across member 2, and is provided in its end with an elongated slot 5 to receive a headed rivet 6 secured to member 2 so as to limit the separation of the members. Both of these members are provided with upwardly and rearwardly projecting walls 7, which serve to confine not only the forward end of the shoe 8, but the forward portion of the hoof 9 as well. On the under face of the members 1, and 2, curved bars 10 are secured and these curved bars and the members 1, and 2, are provided with registering screw-threaded openings to receive the screw-threaded shanks 11 of removable calks 12, the body of said calks 12 being preferably angular for the reception of a wrench to turn them, and the shanks provided at their inner ends with screw-driver receiving grooves 13, so that in the event the body of the calk is broken from the shank, the shank can be readily unscrewed and removed from bar 10 without the necessity of drilling the latter.

On the upper faces of the members 1 and 2, blocks 14 are provided and sustain the weight of the animal on the boot, the shoe 8 contacting directly with these blocks.

On member 2, and extending longitudinally of the boot at the center thereof, is a screw-threaded adjusting rod 15 which is supported in brackets 16 and 17, held against longitudinal movement by means of a pin 18 against bracket 17, and an enlarged angular head 19 against bracket 16, said head 19 adapted to receive a wrench to turn the screw and adjust the boot as will be hereinafter explained. On this screw-threaded rod 15, a block 20 is provided and has a screw-threaded opening to receive the rod, and is adjusted longitudinally of the boot as the rod is turned. The ends of the block 20 are bifurcated and in their bifurcated ends clamping bars 21 are secured, and project through recesses in the rear blocks 14, and are slotted as shown at 22 for the reception of pins 23 in said blocks 14 to hold the bars 21 in normal operative position. The rear ends of these bars 21 project upwardly and forwardly as shown at 24, and are provided on their inner faces with teeth 25. These ends 24 which constitute clamping jaws, are provided at their outer edges with walls or flanges 26, which engage the outer edges of the heels of the shoe limiting the inward movement of the bars, while the ends 24 clamp downwardly upon the extreme ends of the shoe and prevent any downward movement of the boot from the hoof, when the bars are moved forwardly by means of the screw-threaded rod 15.

The boot may be expanded transversely to fit various sizes of shoe and hoof, and in order that the rod 15 may always be centered regardless of the adjustment of the boot, bracket 16 is made with an elongated opening 27 to receive rod 15 allowing the latter to move as the members 1 and 2 are moved relatively to each other.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. In a boot of the character described, the combination with two members, pivotally connected at their forward ends, and calks removably secured to the under faces of said members, of a longitudinally disposed screw-threaded rod supported on one of said members, a block adjustable on said rod, rearwardly projecting shoe clamping bars connected at their forward ends to said block, and upwardly and forwardly projecting toothed jaws on the rear ends of said bars constructed to engage the rear ends of the shoe, substantially as described.

2. In a boot of the character described, the combination with two members, pivotally connected at their forward ends, and calks removably secured to the under faces of said members, of a longitudinally disposed screw-threaded rod supported on one of said members, a block adjustable on said rod, rearwardly projecting shoe clamping bars connected at their forward ends to said block, upwardly and forwardly projecting toothed jaws on the rear ends of said bars constructed to engage the rear ends of the shoe, said jaws having forwardly projecting flanges at their outer edges confining the corners at the rear ends of the shoe, substantially as described.

3. A boot of the character described, comprising two members pivotally connected at their forward ends, and upwardly and rearwardly projecting walls on said members adapted to confine the forward end of a shoe and hoof, of a tongue on one of said members projecting over the other member and having a longitudinal slot therein, a rivet secured to the other member and located in said slot limiting the separation of said members, a screw-threaded rod having rotary mounting on one of said members, a block having a screw-threaded opening to receive the rod, and shoe clamping bars pivotally connected to said block, substantially as described.

4. A boot of the character described, comprising two members pivotally connected at their forward ends, and upwardly and rearwardly projecting walls on said members adapted to confine the forward end of a shoe and hoof, of a tongue on one of said members projecting over the other member and having a longitudinal slot therein, a rivet secured to the other member and located in said slot limiting the separation of said members, brackets on one of said members having elongated slots therein, a longitudinally disposed screw-threaded adjusting rod supported in said slots, a block having a screw-threaded opening to receive said rod, rearwardly projecting clamping bars secured to said block, and shoe engaging jaws at the rear ends of said bars, substantially as described.

5. A boot of the character described, comprising two members pivotally connected at their forward ends, and upwardly and rearwardly projecting walls on said members adapted to confine the forward end of a shoe and hoof, of a tongue on one of said members projecting over the other member and having a longitudinal slot therein, a rivet secured to the other member and located in said slot limiting the separation of said members, brackets on one of said members having elongated slots therein, a longitudinally disposed screw-threaded adjusting rod supported in said slots, a block having a screw threaded opening to receive said rod, rearwardly projecting clamping bars secured to said block, shoe engaging jaws at the rear ends of said bars, blocks secured to said members and constructed to support the weight of the hoof thereon, two of said blocks recessed to receive said clamping bars, the latter having longitudinal slots therein, and pins in said blocks projecting through said slots, substantially as described.

6. A boot of the character described comprising two members pivotally connected and capable of expansion and contraction transversely to fit various sizes of shoes and hoofs, upwardly and rearwardly projecting walls on said members to confine the forward portion of the shoe and hoof, a screw-threaded rod having rotary mounting on one of said members, a block having a screw-threaded opening to receive the rod, bars pivotally connected to said block, and shoe engaging jaws on the free ends of said bars, substantially as described.

In testimony whereof I have signed my name to this specification in the presence of two subscribing witnesses.

WILLIAM H. STAHL.

Witnesses:
R. H. KRENKEL,
C. E. POTTS.